ated Apr. 13, 1937

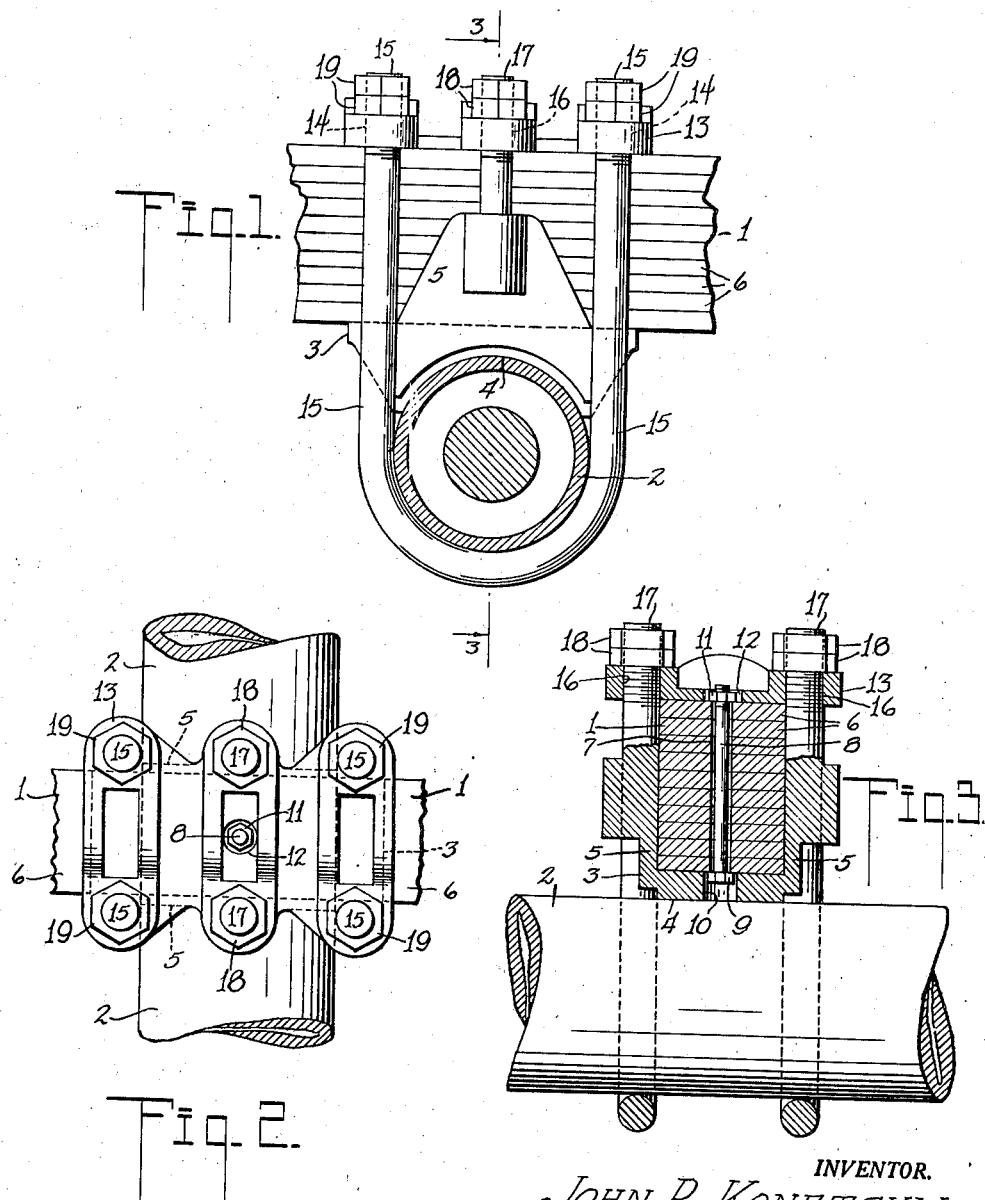

2,077,048

UNITED STATES PATENT OFFICE 2,077,048

AXLE SPRING MOUNTING

John R. Konetsky, San Francisco, Calif.

Application April 23, 1935, Serial No. 17,870

3 Claims. (Cl. 267—52)

My invention relates to improvements in axle spring mountings, and it consists of the combinations, constructions and arrangements hereinafter described and claimed.

In axle spring mountings for vehicles such as trucks, trailers and automobiles, it is customary to secure the leaf spring to the leaf spring seat by U bolts, and with these same U bolts to secure the leaf spring seat to the axle housing. In trucks the leaf springs are composed of a number of leaves, and this makes the springs relatively thick at the place where they are to be joined to the leaf spring seat and the axle housing. The U bolts are therefore long and are subjected to undue strain from working conditions. In tubular axle housings, the seat is welded or otherwise secured to the housing so as to be held against rocking on the housing. In housings rectangular in cross section, the seat need not be held against rocking on the housing, and the U bolts are used to secure the seat to the housing in addition to securing the leaf spring to the seat.

The strain on the U bolts is derived from torques placed on the axle housing due to either the driving torques of the wheels, or to the braking torque on the axles when the brakes on the vehicle are applied. The strain in time will stretch the U bolts, and as soon as this takes place the springs forming the leaf spring will become loosened. The spring very likely will move with respect to the seat due to the loosening of the U bolts from stretching, and this will throw the axle out of alignment with a result that the tires will wear more rapidly, and it will require more force to move the vehicle over the ground. Moreover, the loosening of the U bolts on the leaves of the leaf spring will permit the leaves to creep with respect to each other, and this will result in the axles running out of alignment. It will also be apparent that when the U bolts become loosened due to stretching, the leaves will fulcrum on the edges of the seat, and this will cause the portions of the leaves disposed between the edges of the seat to buckle each time the leaf spring is flexed. This in time will break the leaf springs at the point between the U bolts.

To overcome all of these disadvantages I provide auxiliary means for clamping the leaf spring to the seat, and this means cooperates with the U bolts for clamping the leaf spring to the seat and to the axle. The U bolts therefore still perform the function of clamping the assembly to the axle housing, but they are aided in this by the auxiliary spring clamping means.

The auxiliary means for securing the leaf spring to the seat comprises side members formed integral with the seat for bearing against the sides of the leaf spring. These side members will prevent the leaves of the spring from rotating with respect to each other about the centers of the springs. Short bolts are carried by the side members, and these have the leaf spring cap tightly secured thereto so that the cap will be drawn down upon the top of the leaf spring, and will clamp the spring to the seat. The auxiliary bolts are short in length and therefore will not stretch as will the long U bolts. The U bolts are used in the ordinary manner for securing the assembly to the axle housing, and are aided in clamping the spring to the seat by the short bolts. I have found that with this auxiliary fastening, the life of the leaf spring is indefinitely prolonged. Moreover, the axle housing is held in alignment, and this obviates the undue wear on tires, etc.

The device is extremely simple in construction and is so designed as to be readily added to standard axle spring mountings. It is only necessary to change the seat and the cap to change the standard mountings to my improved one.

Other objects and advantages will appear in the following specification, and the novel features of the device will be particularly pointed out in the appended claims.

My invention is illustrated in the accompanying drawing forming a part of this application, in which Figure 1 is a side elevation of the device shown operatively applied to a tubular axle housing and leaf spring;

Figure 2 is a top plan view of Figure 1; and

Figure 3 is a section along the line 3—3 of Figure 1.

In carrying out my invention I make use of a leaf spring indicated generally at 1, and this spring is secured to the chassis of a vehicle (not shown) in the usual manner. I also make use of an axle housing indicated generally at 2. This housing is shown cylindrical in shape in Figure 1, but it is obvious that the housing can be of any other shape desired, such as being rectangular in cross section. On the housing 2 I mount a seat 3, and since the housing 2 is cylindrical in shape the under surface 4 of the seat 3 is made semi-cylindrical so as to conform with the housing. In the cylindrical housing the seat is welded or otherwise secured to the housing to stop it from slipping around the housing.

The seat 3 is wide enough to receive the leaf spring 1, and it has side members 5 which straddle the sides of the leaf spring. In Figures 1 and 2 I show how the sides 5 bear against the sides of the leaf springs 1 so as to hold the leaves against rotational movement with respect to each other.

In standard leaf springs, the leaves are held against creeping longitudinally with respect to each other by either providing complementary projections and depressions in abutting leaves or in passing a bolt through aligned openings in the leaves. In the drawing I have shown each leaf 6 as being provided with a central opening 7 through which a tie bolt 8 or other suitable fastening means extends. The head 9 of the bolt 8 is received in an opening 10 in the seat 3, while the nut 11 of the bolt is received in an opening 12 in a cap 13. My invention is just as adaptable for use with leaf springs that are not held together by tie bolts 8.

The cap 13 is usually provided with openings 14 for receiving U bolts 15. These bolts are passed around the axle housing 2 and in the standard axle spring mounting construction secure the seat 3 to the axle housing 2, where the seat is not welded to a tubular housing, and the U bolts also secure the leaf spring 1 to the seat 3.

In order to accommodate the auxiliary fastening means I provide the cap 13 with additional openings 16 for receiving stud bolts 17. These bolts are carried by the sides 5 of the seat 3, and receive nuts 18 whereby the cap 13 is clamped down upon the top of the spring 1. The stud bolts 17 are therefore used for the sole purpose of rigidly clamping the cap and the seat to the leaf spring 1. The clamping is such that the seat is prevented from relative movement with respect to the leaf spring.

The spring 1 after being assembled to the cap 13 and the seat 3 is now secured to the axle housing 2 by means of the U bolts 15. The U bolts are provided with nuts 19 by means of which the seat 3 is clamped upon the axle housing, if a housing tubular in cross section is used.

It will be seen from this construction that the stud bolts 17 coperate with the U bolts 15 in clamping the spring to the seat. Should the U bolts stretch for any reason already stated, the spring will still be clamped to the seat by the stud bolts 17. This will stop any relative creeping between the leaves of the spring or between the spring and its seat. The spring is also held against flexing on the ends of the seat and breakage of the spring is thus prevented.

The stud bolts 17 are therefore an aid to the U bolts 15 in keeping the spring seated. The U bolts still clamp the entire assembly to the axle. The device is extremely simple in construction and yet is durable and efficient for the purpose intended.

While I have shown only the preferred form of my invention, it should be understood that various changes or modifications may be made within the scope of the appended claims without departing from the spirit of the invention.

I claim:

1. In combination, a leaf spring, a seat, a cap, stud bolts for connecting the cap to the seat, nuts on the stud bolts for clamping the spring between the cap and the seat, and U bolts for connecting the assembly to an axle housing, said stud bolts aiding the U bolts in clamping the spring to the seat.

2. The combination with a leaf spring, a seat therefor, a cap, and U bolts for securing the assembly to an axle housing, of auxiliary bolts carried by the seat, said cap having openings for receiving the auxiliary bolts, nuts received by the auxiliary bolts for clamping the cap spring and seat together, said seat having sides engaging with the sides of the spring for preventing lateral swinging of the spring in the seat.

3. In combination, a leaf spring having leaves, a spring seat, side members carried by the seat and bearing against the sides of the leaf spring for preventing lateral swinging of the spring in the seat, stud bolts carried by the side members, a cap having openings for receiving the stud bolts, nuts threaded on the stud bolts for clamping the spring between the cap and the seat, said cap having other openings for receiving U bolts, U bolts passed through the openings and connecting the assembly to an axle housing, said stud bolts aiding the U bolts in clamping the spring to the seat.

JOHN R. KONETSKY.